Figure 1:
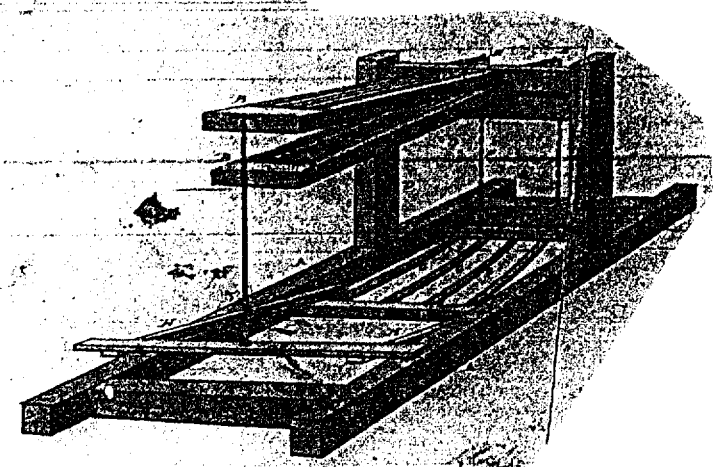

CLASSIFICATION
95-14 X
DIVISION
95-14 X

J. PUGH STELL

Reading, Penna.

3-18-1836

A. Sills
B. Upper & lower guards
C. Cross pieces
D. Uprights
E. Stump arms
F. Chains
G. Springs
H. Treadles Strickland del.

Stell's specification
Made under the direction of the commissioner of Patents
in conformity with act of 3rd March 1836

Henry L. Ellsworth
Commissioner of Patents

Mar. 18. 1836 121

John Pursell
Letters Patent 9514X

The schedule referred to in these Letters Patent and making
part of the same containing a description in the words of the said
John Pursell himself of his improvement in the machine
for breaking Hemp.

To all whom these presents shall come

Be it known that I John Pursell of the Town of Perryville
in the County of Mercer and State of Kentucky have inven
ted a new and useful hemp break and that the following
is a full and exact description thereof. Two sills nine
feet long framed together with cross timber three feet long
the head and swords as of a common break the hinder end
of the lower swords being incorporated into a cross piece of tim-
ber framed into two uprights four feet six inches high to the
cross piece wherein the hinder ends of the upper swords are incor-
porated are two stump arms from which chains are suspended
and the lower end thereof fastened to the springs there being five
springs which is designed to be worked underneath horizon-
tally (but may be worked perpendicularly at the hinder end
of the break) The machinery is worked and put in motion by
means of two treadles eight feet long connected together by a
cross piece of timber four feet long. What I claim as my own
invention and not previously known in the above described
machine is the applying of springs to a hemp break and the
working of it by a treadle and the great additional force
that the machine requires in its operation by means of the
stump arms which is entirely my own invention.

Witnesses
T. P. Mitchell
Priestly Dougherty
[[illegible]]

John Pursell

1/2